United States Patent
Ye et al.

(10) Patent No.: US 8,041,860 B2
(45) Date of Patent: Oct. 18, 2011

(54) METHOD FOR PRODUCING A MAPPING TOOL, A PC GAME HAVING THE MAPPING TOOL AND OPERATION METHOD THEREFORE

(75) Inventors: Zhou Ye, Taipei (TW); Shun-Nan Liou, Kaohsiung (TW); Ying-Ko Lu, Taoyuan County (TW); Ching-Lin Hsieh, Taoyuan County (TW)

(73) Assignee: CyWee Group Limited, Tortola (VG)

( * ) Notice: Subject to any disclaimer, the term of this patent is extended or adjusted under 35 U.S.C. 154(b) by 263 days.

(21) Appl. No.: 12/314,624

(22) Filed: Dec. 15, 2008

(65) Prior Publication Data

US 2010/0153596 A1    Jun. 17, 2010

(51) Int. Cl.
G06F 13/12 (2006.01)
G06F 13/00 (2006.01)
(52) U.S. Cl. .............................. 710/62; 463/36; 345/163
(58) Field of Classification Search .............. 710/36–38, 710/62–67; 715/762; 463/36–39; 345/163
See application file for complete search history.

(56) References Cited

U.S. PATENT DOCUMENTS

| | | | |
|---|---|---|---|
| 6,213,880 B1* | 4/2001 | Sim ................................ | 463/37 |
| 6,488,584 B2* | 12/2002 | Nelson ............................ | 463/37 |
| 2008/0288878 A1* | 11/2008 | Hayashi et al. ............... | 715/762 |
| 2009/0048021 A1* | 2/2009 | Lian et al. ...................... | 463/37 |
| 2009/0291759 A1* | 11/2009 | Cox et al. ....................... | 463/37 |

* cited by examiner

Primary Examiner — Christopher B Shin
(74) Attorney, Agent, or Firm — Winston Hsu; Scott Margo

(57) ABSTRACT

A method for producing a mapping tool, a PC game having the mapping tool and operation method therefore is disclosed. The mapping tool is created by means of linking a remote motion signal generated from a remote device which is operated by user with a keyboard signal from the inside of the conventional keyboard mapping table. User may operate the PC game through the mapping tool. The present invention employs the said mapping tool to replace the conventional keyboard motion mapping table, thereby achieving the objectives of providing natural ergonomic and consistently using the existing PC game having the keyboard motion mapping table.

9 Claims, 4 Drawing Sheets

METHOD FOR PRODUCING A MAPPING TOOL, A PC GAME HAVING THE MAPPING TOOL AND OPERATION METHOD THEREFORE

BACKGROUND OF THE INVENTION

1. Field of the Invention

The present invention relates to a method for producing a mapping tool, a PC game having the mapping tool and operation method therefore; in particular, to a system and method which replaces the keyboard mapping table with the mapping tool, and uses the remote signal generated by a remote device to operate conjunctively with the mapping tool to control the PC game.

2. Description of Related Art

In human daily lives, apart from working, studying and sleeping, the rest of time is mostly devoted to activities for recreation and entertainment. Among these activities, video game sites are widely favored by people, and there in such sites usually place various types of video games to allow people to play. Recently, thanks to rapid development and advancement of computer industry, many video games originally designed for large video game machines have been transplanted to stand-alone computers, commonly referred as PC games.

When the computer industry arose, many game design companies veered to design many popular PC games. In order to match the computer peripheral input devices, all actions of each character in a PC game needs to receive the signal transferred by the computer peripheral input devices. Taking the keyboard and direction keys as the computer peripheral input device for example, it may be like that: jump up motion is represented by the Up key (↑) on the keyboard, jump down motion indicated by the Down key (↓), forward motion by the Left key (←) and backward motion by the Right key (→). All motions of each character of the PC game have been programmed by the game design company as a keyboard motion mapping table in advance and stored in the PC game; when a user plays the aforementioned PC game and operates the direction keys on the keyboard, the PC game can understand the motion instructed by the user through the above-said keyboard motion mapping table, thereby generating corresponding actions.

However, the said scheme for PC game design may cause the following drawbacks:

1. although such a PC game design approach may satisfy computer industry's needs, it does not fit human ergonomics, probably inducing injuries or negative influences on user's fingers;

2. such a PC game design approach may at last lead to the competitions in speed between the user's control and the computation of PC operations, totally losing the effects of recreational activities;

3. the above-mentioned input devices of the PC game are limited to the keyboard or mouse, so the user can only play the PC game within a certain restricted space, as a result the extent of entertainment has been significantly reduced.

Accordingly, the inventors of the present invention have considered the improvable defects illustrated hereinbefore, particularly devoted to the relevant development and, in conjunction with theoretical applications and expertise, proposed the present invention of reasonable design which provides effectiveness in resolving the aforementioned issues.

SUMMARY OF THE INVENTION

The essential objective of the present invention is to provide a method for producing a mapping tool, a PC game having the mapping tool and operation method therefore, which system and operation method allowing to use a remote device to output at least one remote motion signal, resolve the at least one remote motion signal to create a mapping tool, replace the conventional keyboard mapping table with the created mapping tool, and use the remote device in conjunction with the mapping tool to control the PC game.

To achieve the above-said objective, the present invention provides a method for producing a mapping tool, comprising creating a remote motion database having a plurality of remote motions; reading a keyboard motion mapping table; resolving a plurality of keyboard commands and a plurality of motion commands included in the keyboard motion mapping table; searching for the corresponding remote motion commands based on such motion commands; and linking such remote motion commands with such keyboard commands to produce the mapping tool.

To achieve the above-said objective, the present invention provides a PC game system having the mapping tool, comprising a host, consisting of a wireless reception device and at least one PC game; a remote device, generating a remote motion signal and transmitting it to the wireless reception device; and a mapping tool, consisting of a remote motion resolution section and a remote motion mapping table, the remote motion resolution section being used to resolve the remote motion signal, and to generate the remote motion mapping table based on the results of the resolution, in which the remote device controls the PC game in accordance with the remote motion mapping table.

To achieve the above-said objective, the present invention provides a PC game operation method using the mapping tool, comprising loading at least one PC game having a keyboard motion mapping table; installing a mapping tool; receiving at least one remote motion signal; resolving such remote motion signals through the mapping tool; separating at least one keyboard key signal in the keyboard motion mapping table by means of the mapping tool; linking such remote motion signals with such keyboard key signals; and operating the PC games using the mapping tool.

The present invention provides the following beneficial effects:

1. the user, during PC game operations, may be exempted from the limitation of keyboard, better conforming to humanized operation condition and achieving the goal of natural ergonomics, without causing injuries or negative influences on specific portions of user's body (e.g. fingers). It is also possible to enhance the effect of entertainment by exploiting the features of the mapping tool;

2. the game design company needs not to abandon popular PC games developed in earlier days, the user can still play the existing PC game through the mapping tool; hence, the game design company is able to significantly reduce the cost of game development.

In order to facilitate further understanding of the characteristics and technical contents of the present invention, references are made to the detailed descriptions and appended drawings of the present invention; however, the appended drawings are simply referential and illustrative, rather than being used to limit the scope of present invention thereto.

DETAILED DESCRIPTION OF PREFERRED EMBODIMENTS

In order to work with computer peripheral device, the design of PC games at early stage mostly used a keyboard or mouse as the input source; therefore, a keyboard motion mapping table is designed by software programming in each PC game, in which the keyboard motion mapping table records the correspondence between each motion command of the PC game and any key command on a keyboard. The purpose of the keyboard motion mapping table is to allow the PC game to be able to resolve the motion command issued by the user through a specific key, and then, using the keyboard motion mapping table, to facilitate execution of corresponding motions to the PC game. For example, jump up motion is represented by the Up key (↑) on the keyboard, jump down motion indicated by the Down key (↓), forward motion by the Left key (←) and backward motion by the Right key (→).

However, as the drawbacks caused by the keyboard motion mapping table in the prior art set forth hereinbefore, this may largely weaken the entertaining effect created by existing PC games. Besides, since people's demands may increase and health-care issues may become noticeable in the future, long-term use of the PC game employing existing keyboard motion mapping table by the user can result in specific injuries to user's body (e.g. fingers), so conventional PC games using the keyboard motion mapping table will inevitably vanish on the market gradually.

In order to allow existing popular PC games to survive on the current market, the present invention provides a new mapping tool to substitute the conventional keyboard motion mapping table, and the mapping tool of the present invention can also get rid of limitation in keyboard using a remote device as the input device.

Figure 1A:
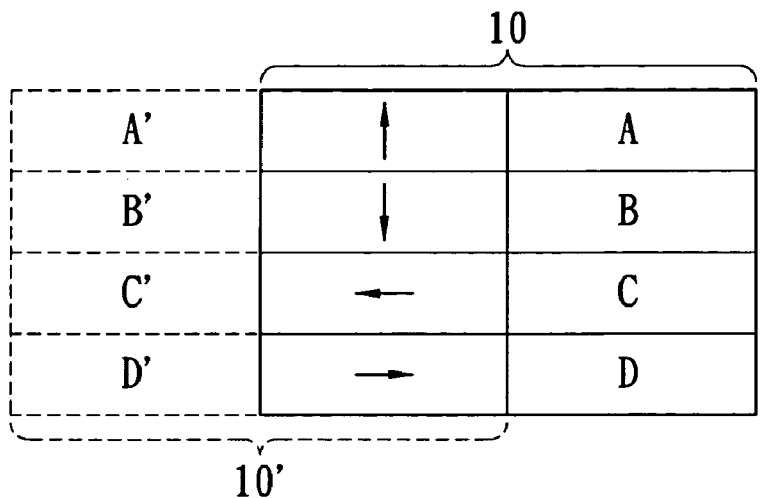
FIG. 1A shows a diagram for an embodiment of the mapping tool according to the present invention.
Figure 1B:
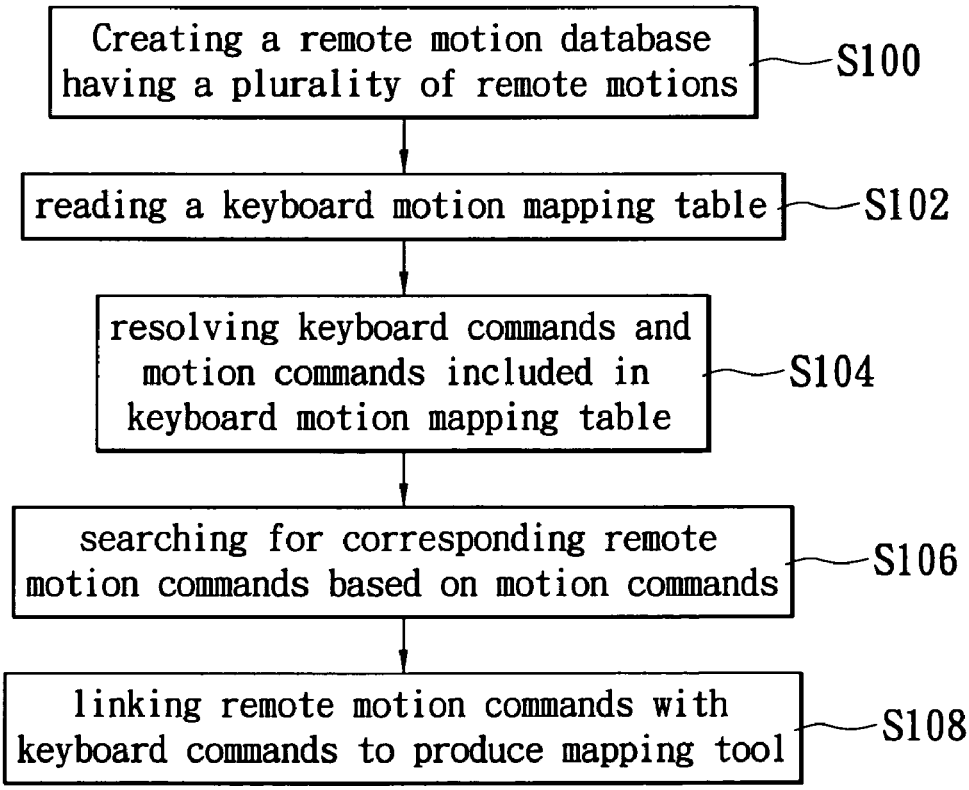
FIG. 1B shows a flowchart for the method of producing the mapping tool according to the present invention.

Refer conjunctively to FIGS. 1A and 1B, wherein FIG. 1A shows a diagram for an embodiment of the mapping tool according to the present invention, and FIG. 1B shows a flowchart for the method of producing the mapping tool according to the present invention. In implementation, the mapping tool set forth hereinafter may be a software application.

In FIG. 1A, the mapping tool 10' according to the present invention is linked with the original keyboard mapping table 10, wherein the Up key (↑), Down key (↓), Left key (←) and Right key (→) each represents respective direction key on the keyboard, while the alphabets A, A' indicate jump up motions, the alphabets B, B' indicate jump down motions, the alphabets C, C' indicate forward motions and the alphabets D, D' are for backward motions. Each motion in the mapping tool 10' according to the present invention is not instructed by the keyboard, but enabled by a remote motion signal generated by an external remote device, and then the key press signal on the keyboard is simulated based on the generated remote motion signal so as to replace the effect of the keyboard mapping table 10, further using the remote motion signal to control the PC game. Details of the method for producing the mapping tool 10' according to the present invention can be shown as FIG. 1B, and will be explained infra.

In the method shown as FIG. 1B, it generates a plurality of remote motion commands with an external remote device, and creates a remote motion database consisting of the remote motion commands based on the remote motion commands (S100), wherein such remote motion commands may be motions such as, but not limited thereto, swing up, swing down, swing left, swing right, circling, swing upper right to lower left, swing upper left to lower right, stab forward or retract backward, then the mapping tool 10' determines on each remote motion command to define an actual motion. Next, it reads the keyboard mapping table 10 (S102) to further resolve the plurality of keyboard commands and plurality of motion commands in the keyboard motion mapping table 10 (S104); upon completion of the resolution, the mapping tool 10' appreciates the correspondence between the keyboard commands in the keyboard motion mapping table 10 and the motion commands. Subsequently, the mapping tool 10' searches for the corresponding remote motion command based on the motion command (S106), and when the corresponding remote motion command being searched is located, the mapping tool 10' links the remote motion command with the keyboard command included in the keyboard motion mapping table 10; as the linking operation is done, the production of the mapping tool 10' is completed (S108).

Figure 2A:
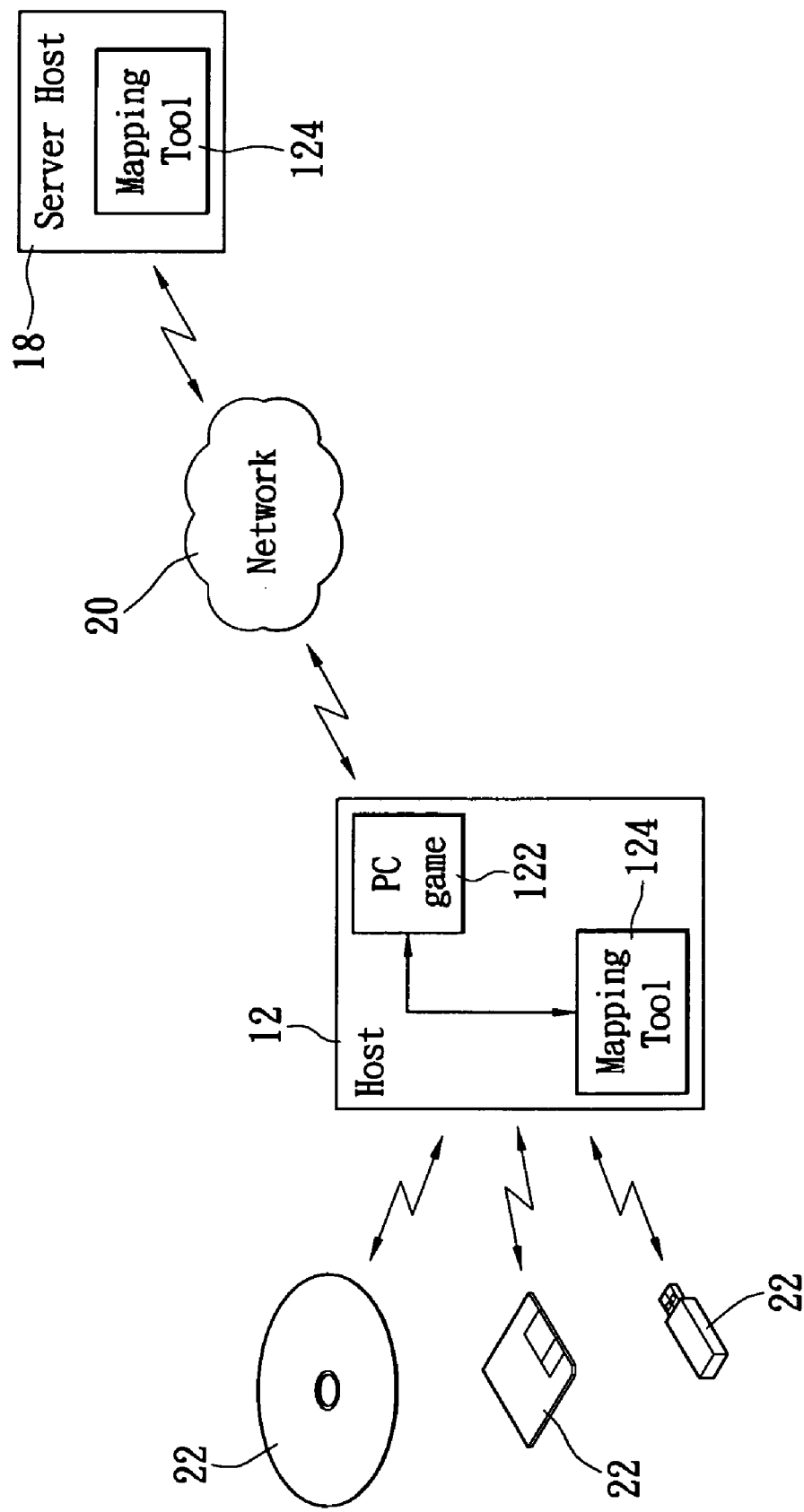
FIG. 2A shows a diagram for the architecture of a PC game system having the mapping tool according to the present invention.
Figure 2B:
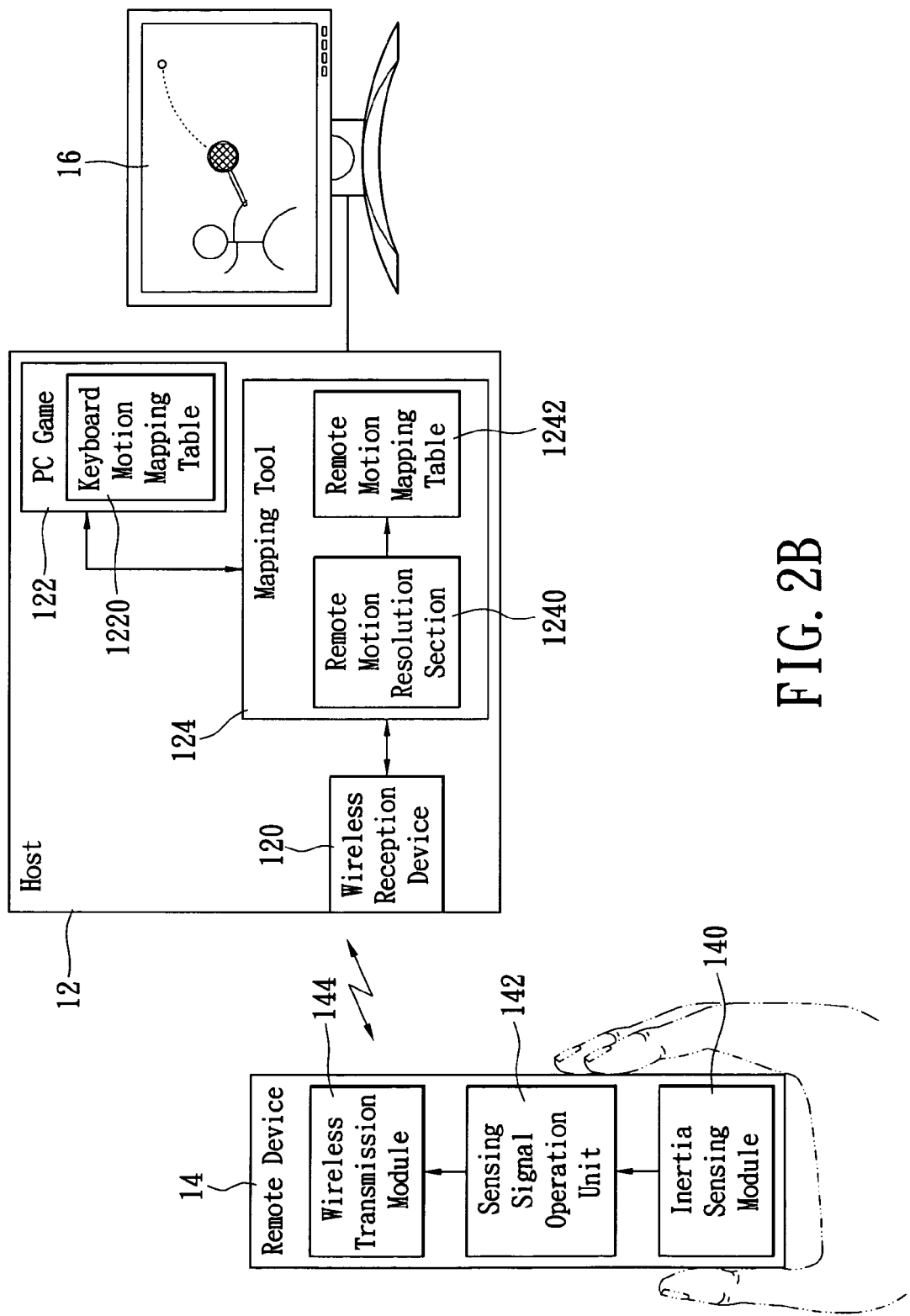
FIG. 2B shows a diagram for an embodiment of a PC game system having the mapping tool according to the present invention.

Refer now conjunctively to FIGS. 2A and 2B, wherein FIG. 2A shows a diagram for the architecture of a PC game system having the mapping tool according to the present invention, and FIG. 2B shows a diagram for an embodiment of a PC game system having the mapping tool according to the present invention. As shown in FIG. 2B, the system comprises a host 12, a remote device 14, a mapping tool 124 and a screen 16. The host 12 can be a desktop computer, and consists of a wireless reception device 120, a mapping tool 124 and at least one PC game 122. The wireless reception device 120 can be a wireless receiver used to receive the remote motion signal transmitted from the remote device 14, and the wireless reception device 120 can employ various types of connection interfaces to connect to the host 12, and such connection interfaces may be a USB interface, IEEE interface or RS-232 interface. The PC game 122 has a keyboard motion mapping table 1220, the keyboard motion mapping table 1220 recording the correspondence between each motion command of the PC game and any key command pressed on a keyboard. The mapping tool 124 consists of a remote motion resolution section 1240 and a remote motion mapping table 1242, the remote motion resolution section 1240 being used to resolve the remote motion signal and generating the remote motion mapping table 1242 based on the result of the resolution; meanwhile, the remote device 14 controls the PC game 122 through the remote motion mapping table 1242 and displays the control result on the screen 16.

As shown in FIG. 2A, the mapping tool 124 can be loaded in the host 12 by at least two fashions. The first approach is to download the mapping tool 124 included in the server host 18 to the host 12 via the network 20, and the second way is to, with a recordable media 22, transfer the mapping tool 124 included in the recordable media 22 to the host 12 by manual loading. The said recordable media 22 may be a Compact Disk (CD), a floppy disc or a USB thumb drive.

The remote device 14 is used to generate a remote motion signal and transmit it to the wireless reception device 120. The remote device 14 consists of an inertia sensing module 140, a sensing signal operation unit 142 and a wireless transmission module 144. The inertia sensing module 140 can sense the acceleration and angular speed of the remote motion that the user performs through the remote device 14 along X axis, Y axis and Z axis and accordingly generates a signal; in the present embodiment, the remote device 14 is held in hand by the user. The inertia sensing module 140 consists of at least one accelerometer or at least one gyroscope. The sensing signal operation unit 142 is used to receive the acceleration and angular speed of the remote motion generated by the inertia sensing module 140, and generates the remote motion signal indicating the acceleration and angular speed of the remote motion through computation; the wireless transmission module 144 receives the remote motion signal generated by the sensing signal operation unit 142, further transmitting such a remote motion signal to the wireless reception device 120 wirelessly (e.g. Bluetooth™, Radio Frequency)

Figure 3:
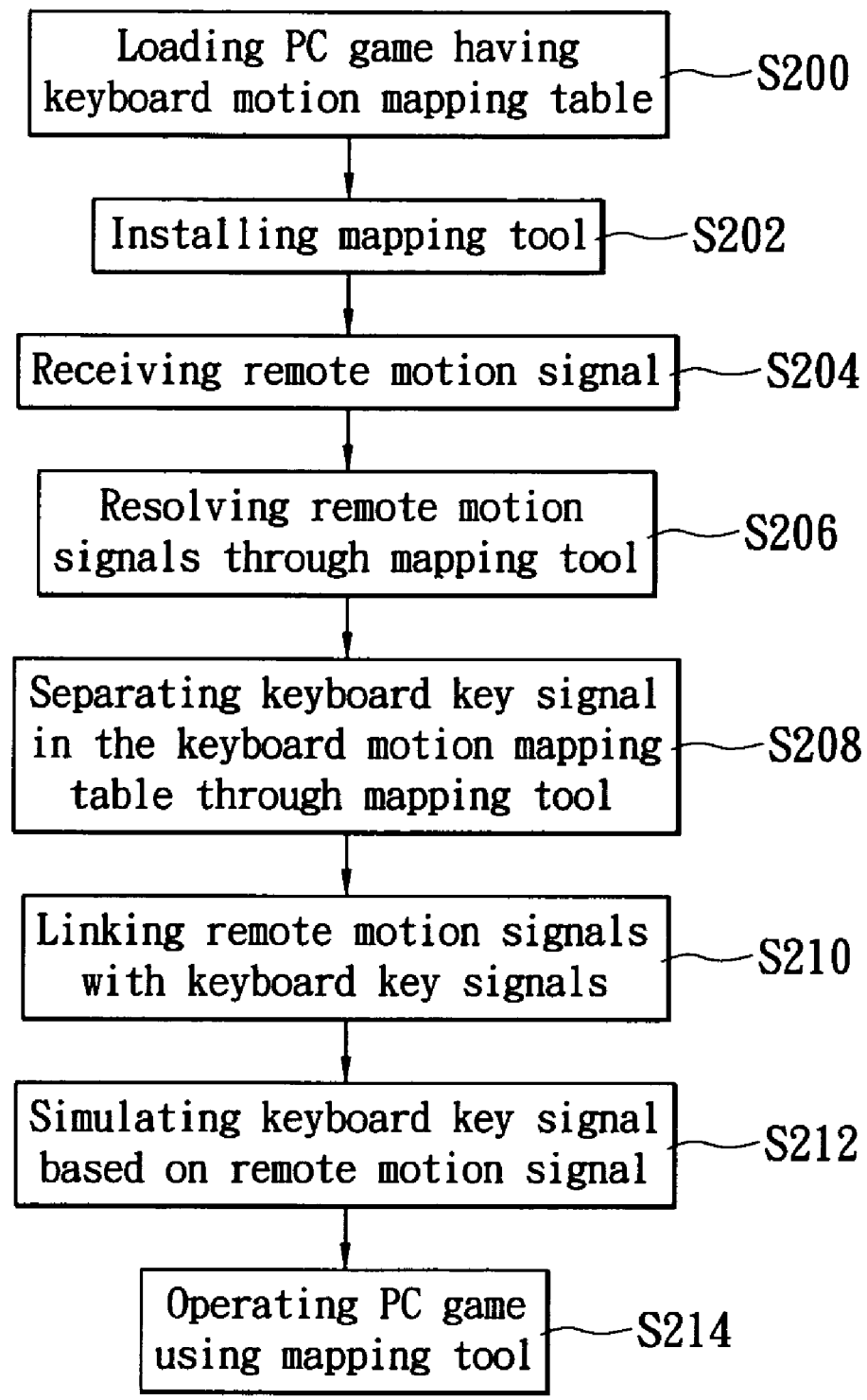
FIG. 3 shows a flowchart for the operation method of a PC game using the mapping tool according to the present invention.

Refer now conjunctively FIGS. 2A, 2B and 3, wherein FIG. 3 shows a flowchart for the operation method of a PC game using the mapping tool according to the present invention. Initially, the user first loads in at least one PC game containing the keyboard motion mapping table 1220 (S200), the keyboard motion mapping table 1220 recording the correspondence between each motion command of the PC game and any key command pressed on a keyboard. The PC game 122 may be an action game, a heuristic game, an adventure game, a shooting game, a simulation game, a sport game or a strategic game, shown on the screen 16 of FIG. 2A as a tennis sport game. Next, it installs the mapping tool 124 into the host 12 (S202), the mapping tool 124 comprising a remote motion resolution section 1240 and a remote motion mapping table 1242. The mapping tool 124 can be installed in two ways; the first approach is to download the mapping tool 124 included in the server host 18 to the host 12 via the network 20 and then install it, and the second way is to, with a recordable media 22 (e.g. a Compact Disk (CD), a floppy disc or a USB thumb drive), install the mapping tool 124 stored therein into the host 12.

The wireless reception device 120 of the host 12 receives the remote motion signal transmitted by the remote device 14 (S204), the remote motion signal being the signal generated by the acceleration and angular speed of the remote motion that the user performs through the remote device 14 along X axis, Y axis and Z axis, and the remote motion resolution section 1240 of the mapping tool 124 receives the remote motion signal transmitted by the wireless reception device 120, then the remote motion resolution section 1240 resolve the received remote motion signal (S206). The remote motion resolution section 1240 can be a motion algorithm which resolves the meaning of the remote motion signal based on the rules defined in the motion algorithm, and creates a remote motion database with each of the resolved remote motion signal, in which the remote motion database can be defined beforehand. The mapping tool 124 next separates the motion command and keyboard key command included in the keyboard motion mapping table 1220 to acquire the keyboard key command (S208), and the mapping tool 124 links the resolved remote motion signal stored in the remote motion database with the separated keyboard key command of the keyboard motion mapping table 1220 (S210); upon completion of such a linkage, the production of the remote motion mapping table 1242 is done. The mapping tool 124 simulates the keyboard key signal based on the remote motion signal through the remote motion mapping table 1242 (S212), and at this moment, the user can now operate the PC game using the mapping tool 124 (S214).

The mapping tool 124 according to the present invention can replace the conventional keyboard motion mapping table 1220. It senses the acceleration and angular speed generated by the user's body with the inertia sensing module 140 of the remote device 14, thereby creating signals indicating motion states of the user's body such as rotation, rhyme, swing or force, then transmitting wirelessly the generated remote state signal to the host 12; in this way, it is possible to provide the feature of high sensitivity, thus satisfying the demand for real-time control. Through the resolution on the remote state signal performed by the remote motion resolution section 1240 of the mapping tool 124 and then using the mapping tool 124 to operate the PC game, it allows the present invention to meet the requirement for real-time operation of high sensitivity.

The present invention provides the following beneficial effects:

1. the user, during PC game operations, may be exempted from the limitation of keyboard, better conforming to humanized operation condition and achieving the goal of natural ergonomics, without causing injuries or negative influences on specific portions of user's body (e.g. fingers). It is also possible to enhance the effect of entertainment by exploiting the features of the mapping tool;

2. the game design company needs not to abandon popular PC games developed in earlier days, the user can still play the existing PC game through the mapping tool; hence, the game design company is able to significantly reduce the cost of game development.

The aforementioned descriptions simply set forth the preferred embodiments of the present invention, rather than limiting the scope of the present invention thereto. It is noted that all effectively equivalent technical modifications and changes made in accordance with the disclosure of the present invention and appended drawings thereof are deemed to be included in the scope of the present invention delineated in the following claims.

What is claimed is:

1. A method for producing a mapping tool, comprising:
creating a remote motion database having a plurality of remote motion commands generated by a remote device;
reading a keyboard motion mapping table from a game program, wherein the keyboard motion mapping table corresponds each of the remote motion commands to its respective keyboard command;
resolving the keyboard commands and a plurality of motion commands included in the keyboard motion mapping table;
searching for the corresponding remote motion commands based on the motion commands; and
linking the remote motion commands with the corresponding keyboard commands to produce the mapping tool.

2. A PC game system having the mapping tool, comprising:
a host, having a wireless reception device and at least one game program;
a remote device, generating remote motion commands in terms of remote motion signals and transmitting the remote motion signals to the wireless reception device for the host having the wireless reception device to prepare a remote motion data base; and
a mapping tool stored in the host, having a remote motion resolution section and a remote motion mapping table, the remote motion resolution section being used to resolve the remote motion signals, and to generate the remote motion mapping table based on resolving the remote motion signals, so that the remote device controls the game program in accordance with the remote motion mapping table;
wherein the remote motion resolution section is configured to read a keyboard motion mapping table having a plurality of motion commands and a plurality of keyboard commands, resolve the keyboard commands and the motion commands, search for the corresponding remote motion commands based on the motion commands, and link the remote motion commands with the corresponding keyboard commands before generating the remote motion mapping table.

3. The PC game system having the mapping tool according to claim 2, wherein keyboard motion mapping table corresponds each of motion commands of the game program to its respective keyboard command.

4. The PC game system having the mapping tool according to claim 2, wherein the remote device comprises:
   an inertia sensing module, used to sense an acceleration and an angular speed of the remote device;
   a sensing signal operation unit, receiving information of the acceleration and the angular speed of the remote device; and
   a wireless transmission module, transmitting wirelessly the remote motion signal to the wireless reception device.

5. The PC game system having the mapping tool according to claim 1, wherein the inertia sensing module comprises at least one accelerometer or at least one gyroscope.

6. The PC game system having the mapping tool according to claim 3, wherein the mapping tool searches for the motion command of the game program equivalent to the remote motion signal in the keyboard motion mapping table based on resolving the remote motion signal, in order to acquire the corresponding keyboard commands based on the keyboard motion mapping table, before linking the remote motion signal with the acquired keyboard command.

7. A PC game operation method using the mapping tool according to claim 1, comprising:
   loading the game program having the keyboard motion mapping table;
   installing the mapping tool;
   receiving the remote motion signals;
   resolving the remote motion commands generated by the remote device through the mapping tool;
   separating a keyboard key signal in the keyboard motion mapping table by means of the mapping tool; and
   linking the remote motion signals with the keyboard key signals.

8. The PC game operation method using the mapping tool according to claim 7, wherein the keyboard motion mapping table corresponds each of the remote motion commands of the game program and the keyboard command associated with the keyboard key signal.

9. The PC game operation method using the mapping tool according to claim 7, wherein linking the remote motion signals with the keyboard key signals further comprises simulating the keyboard key signal based on the remote motion commands.

* * * * *